Figure 1:
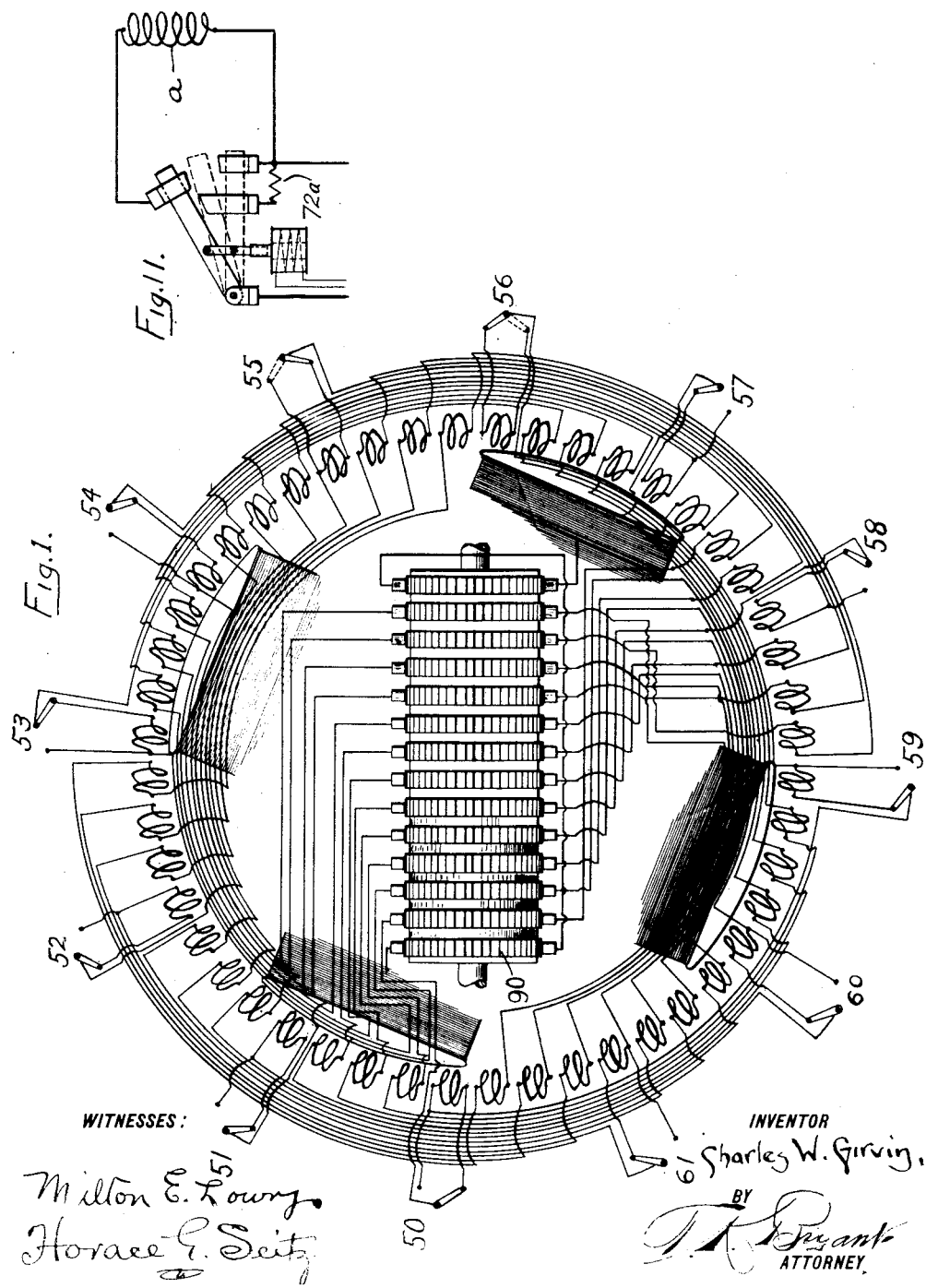

C. W. GIRVIN.
CONTROL OF DIRECT CURRENT MACHINES.
APPLICATION FILED JUNE 12, 1913.

1,196,774.

Patented Sept. 5, 1916.
9 SHEETS—SHEET 1.

C. W. GIRVIN.
CONTROL OF DIRECT CURRENT MACHINES.
APPLICATION FILED JUNE 12, 1913.

1,196,774.

Patented Sept. 5, 1916.
9 SHEETS—SHEET 4.

WITNESSES:

INVENTOR
Charles W. Girvin
BY
ATTORNEY.

C. W. GIRVIN.
CONTROL OF DIRECT CURRENT MACHINES.
APPLICATION FILED JUNE 12, 1913.

1,196,774.

Patented Sept. 5, 1916.
9 SHEETS—SHEET 5.

WITNESSES:
Milton E. Lowry
Horace G. Seitz

INVENTOR
Charles W. Girvin
BY
ATTORNEY.

C. W. GIRVIN.
CONTROL OF DIRECT CURRENT MACHINES.
APPLICATION FILED JUNE 12, 1913.
1,196,774.
Patented Sept. 5, 1916.
9 SHEETS—SHEET 6.
Fig.15.
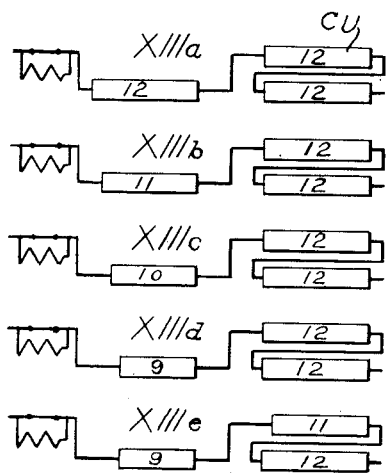
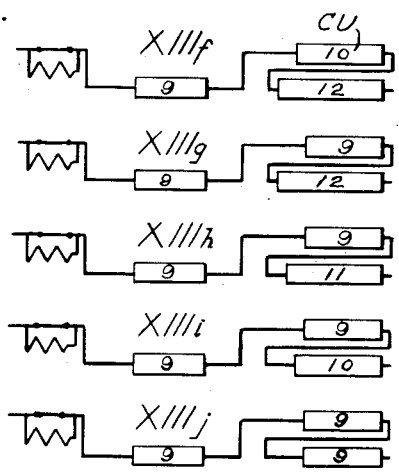
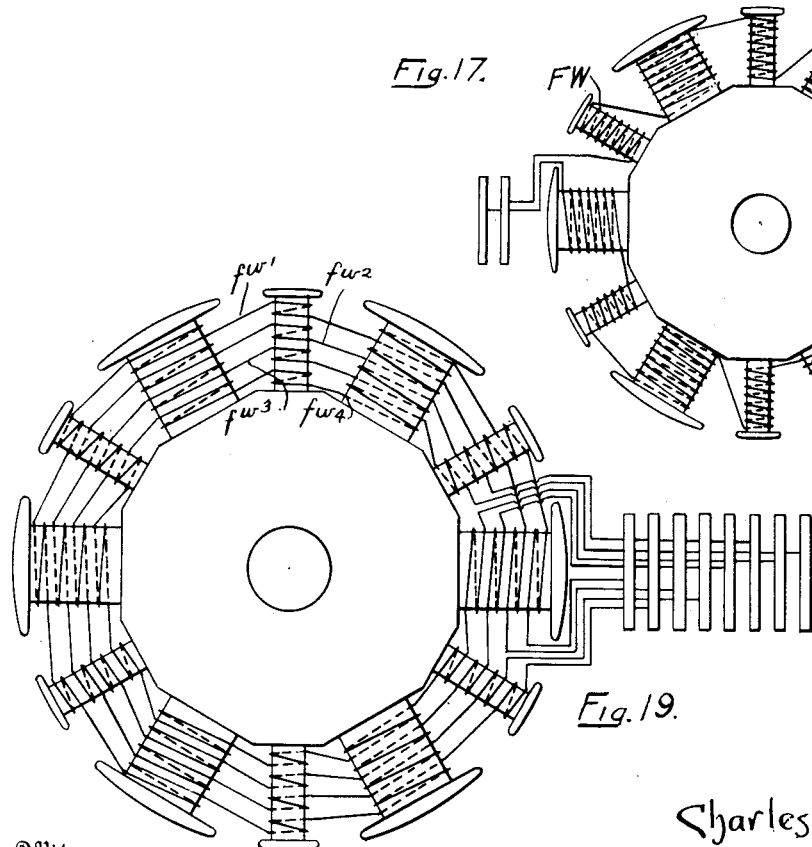
Fig.17.
Fig.19.
Witnesses
Milton E. Lowry
Horace P. Seitz
Inventor
Charles W. Girvin
By T. R. Bryant
Attorney.

C. W. GIRVIN.
CONTROL OF DIRECT CURRENT MACHINES.
APPLICATION FILED JUNE 12, 1913.
1,196,774.
Patented Sept. 5, 1916.
9 SHEETS—SHEET 7.
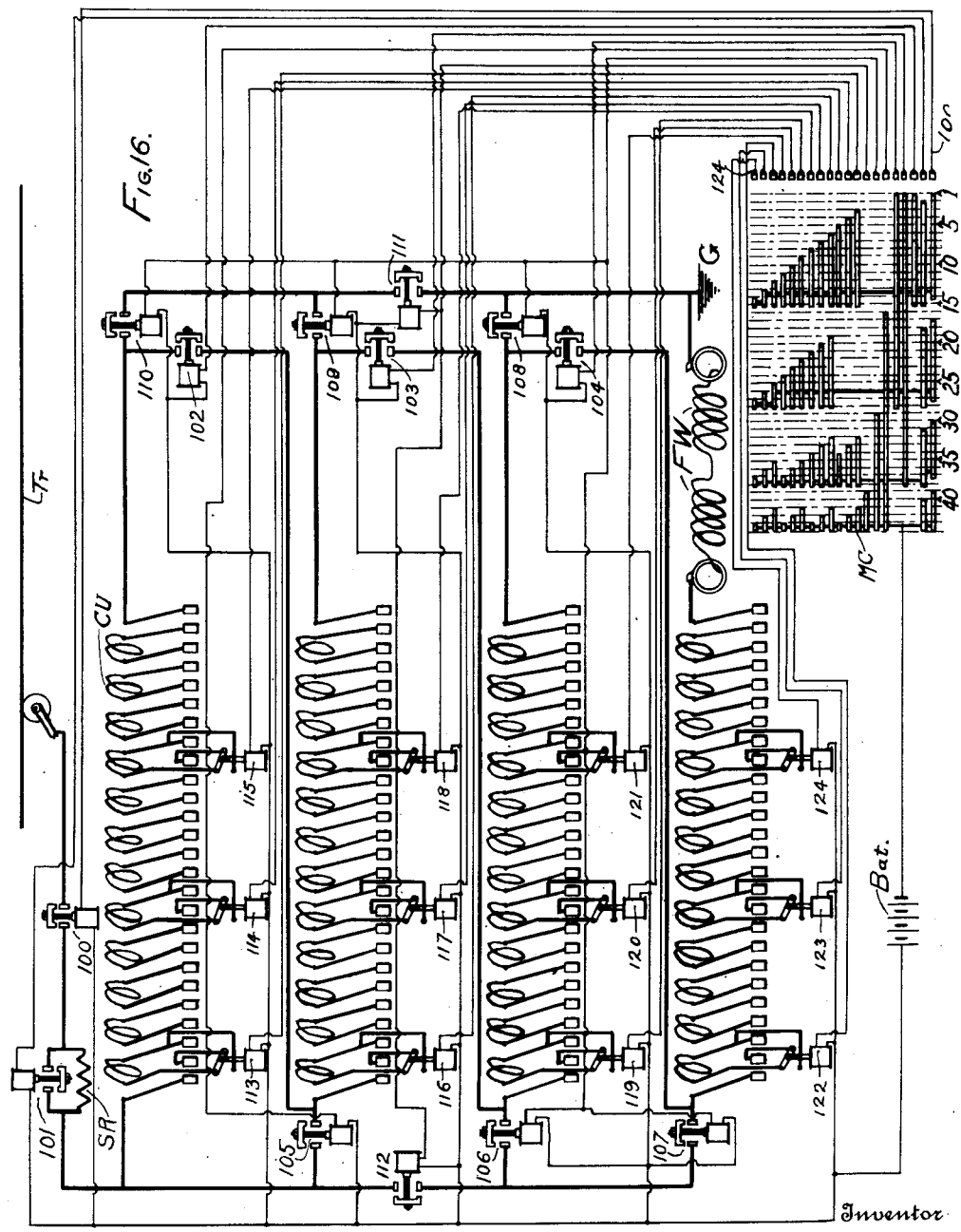

C. W. GIRVIN.
CONTROL OF DIRECT CURRENT MACHINES.
APPLICATION FILED JUNE 12, 1913.
1,196,774.
Patented Sept. 5, 1916.
9 SHEETS—SHEET 8.
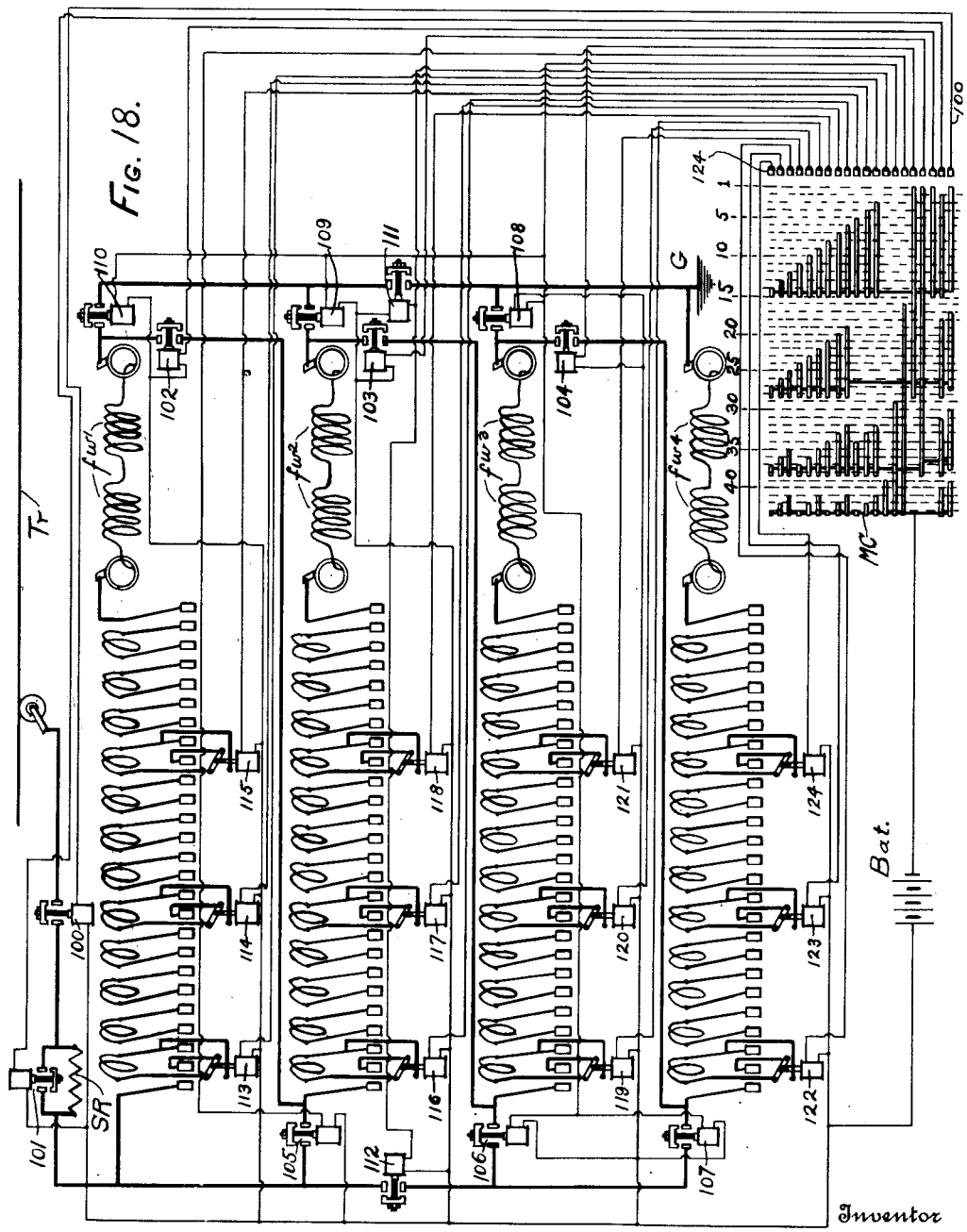
Witnesses
M. E. Lowry
Horace G. Seitz
Inventor
Charles W. Girvin
By T. K. Bryant
Attorney.

C. W. GIRVIN.
CONTROL OF DIRECT CURRENT MACHINES.
APPLICATION FILED JUNE 12, 1913.

1,196,774. Patented Sept. 5, 1916.

9 SHEETS—SHEET 9.

Fig 20

\* Indicates Transition Position.
• Indicates Switches Closed.

Witnesses
Milton E. Lowry
Horace G. Seitz

Inventor
Charles W. Girvin
By T. A. Bryant
Attorney.

UNITED STATES PATENT OFFICE.

CHARLES W. GIRVIN, OF SAN FRANCISCO, CALIFORNIA, ASSIGNOR TO GIRVIN ELECTRICAL DEVELOPMENT COMPANY, LIMITED, OF HONOLULU, TERRITORY OF HAWAII, A CORPORATION OF THE TERRITORY OF HAWAII.

CONTROL OF DIRECT-CURRENT MACHINES.

1,196,774.  Specification of Letters Patent.  Patented Sept. 5, 1916.

Application filed June 12, 1913. Serial No. 773,204.

*To all whom it may concern:*

Be it known that I, CHARLES W. GIRVIN, a citizen of the United States, and residing at San Francisco, in the county of San Francisco and State of California, have invented certain new and useful Improvements in Control of Direct-Current Machines, of which the following is a specification.

This invention relates to the control of direct current machines, as for instance, the voltage control when employed in connection with generators and the speed control when used in connection with motors, by varying the number of armature conductors in series. Heretofore, attempts have been made along somewhat similar lines to control direct current machines as above indicated, but these attempts, so far as I am aware of, have not produced satisfactory results for various reasons.

One reason lies in the fact that direct current machines as heretofore provided have their armature windings in a closed circuit with at least two paths in parallel from positive to negative brushes. This necessitates an equal number of armature turns in series in each parallel path; consequently the varying of the number of turns in series must be exactly concurrent in the several parallel paths in order to prevent serious unbalancing of the E. M. F.'s in said paths, such unbalancing having the effect of causing large local currents in the armature and serious sparking at the brushes.

Another reason lies in the fact that commercial direct current machines generally employ a rotating armature making it a difficult matter to successfully cut in or cut out armature turns while the machine is in operation, excepting by the use of intricate and expensive apparatus for this purpose. While attempts have been made to vary this by providing a stationary armature in which the usual methods of providing parallel paths are employed, the necessary change in brush mounting, etc., acts to prevent successful control in this manner. These general difficulties prevent the practical employment of this method of control, but are overcome when used in connection with a machine falling within the disclosure of English Patent No. 22,270 of 1912, the disclosure of which corresponds in general to that of my application for Letters Patent filed March 11, 1912, Serial No. 683,065, in which a stationary armature is employed, the armature having its windings connected constantly in series and in circuit, thus providing a single series path through the winding. This enables turns or windings to be cut out of circuit as desired without any unbalancing effect, the remaining windings or turns continuing in series and in circuit. As the armature is stationary, the windings or turns are readily accessible, permitting variations in the number of turns in series to be readily made during the operation of the machine. A machine embodying the general ideas of said prior application is shown diagrammatically in the drawings and more specifically referred to hereinafter, the drawings showing one group of coil units having the series relationship, but as in said prior disclosure, the arrangement of coil units may provide for a plurality of groups, as for instance, two, four, eight, etc., according to the use to which the machine is to be put, provisions being made for connecting groups in series, in parallel, or a combination of both, this arrangement enabling these desirable changes to be employed in the control and at the same time eliminating the disadvantages heretofore referred to, and without the requirement of an impracticable number of commutators.

The objects of my invention are therefore to provide a method of controlling direct current machines which will permit of the variation in number of turns or windings in series; which will permit of the employment of the series, parallel-series, or parallel variations; and which will eliminate the difficulties heretofore encountered in attempting to employ this type of control in direct current machines. Also to provide simple and efficient apparatus for the carrying of the method into effect.

To these and other ends, the nature of which will be readily understood as the invention is hereinafter disclosed, my invention consists in the improved construction and combination and arrangement of elements hereinafter fully described, illustrated in the accompanying drawings and more particularly pointed out in the appended claims.

Figure 2:
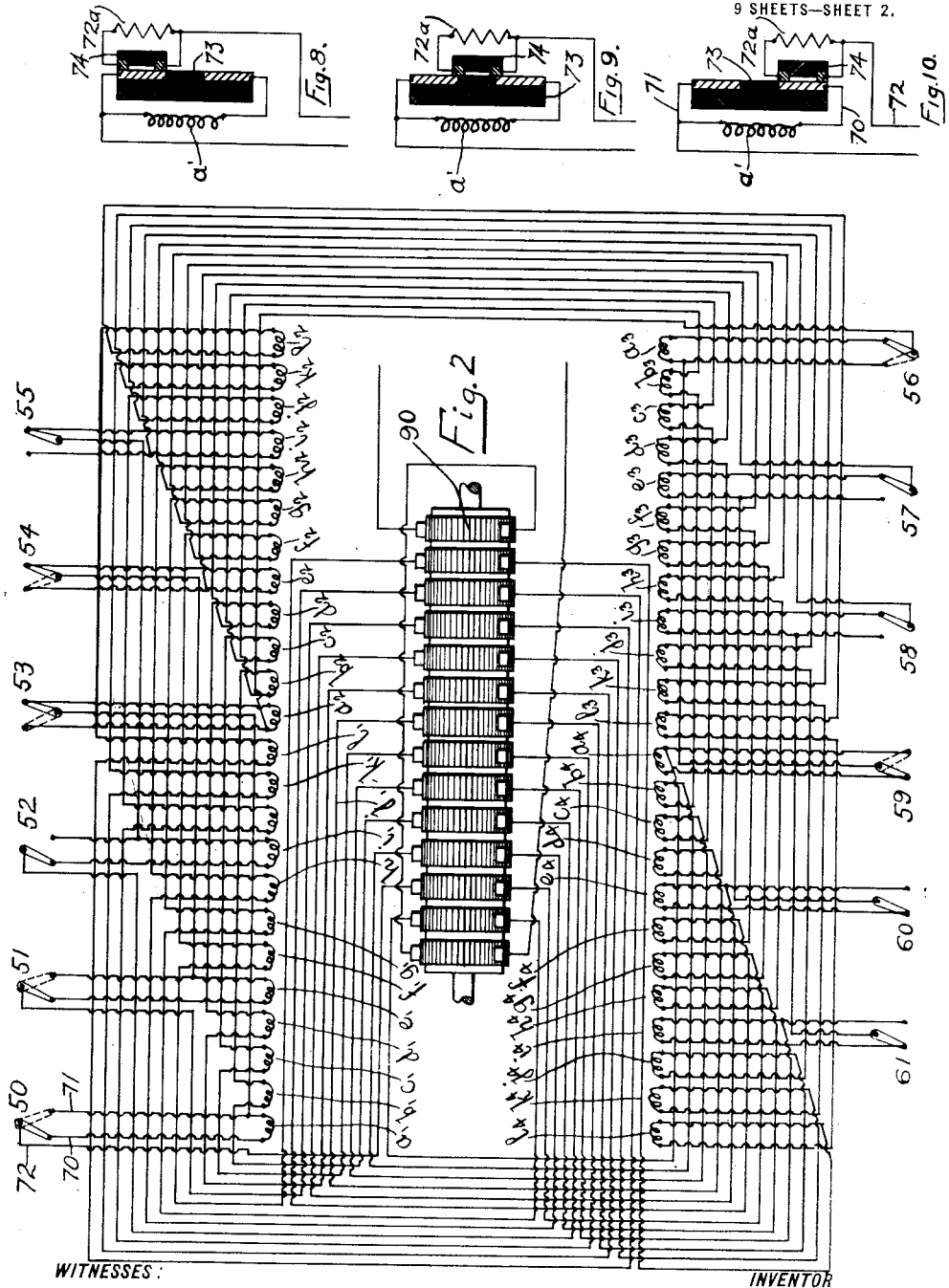
Figure 12:
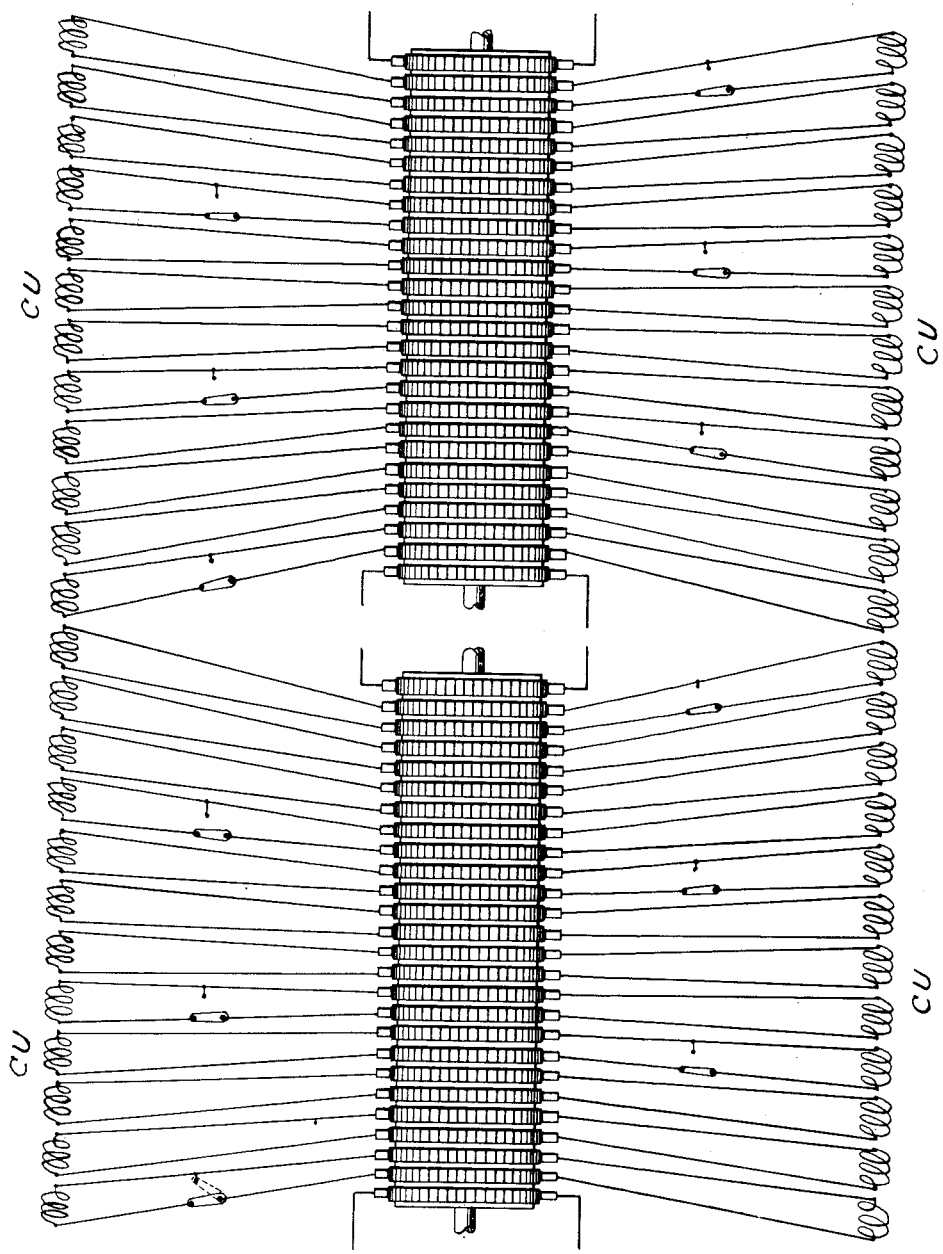
Figure 13:
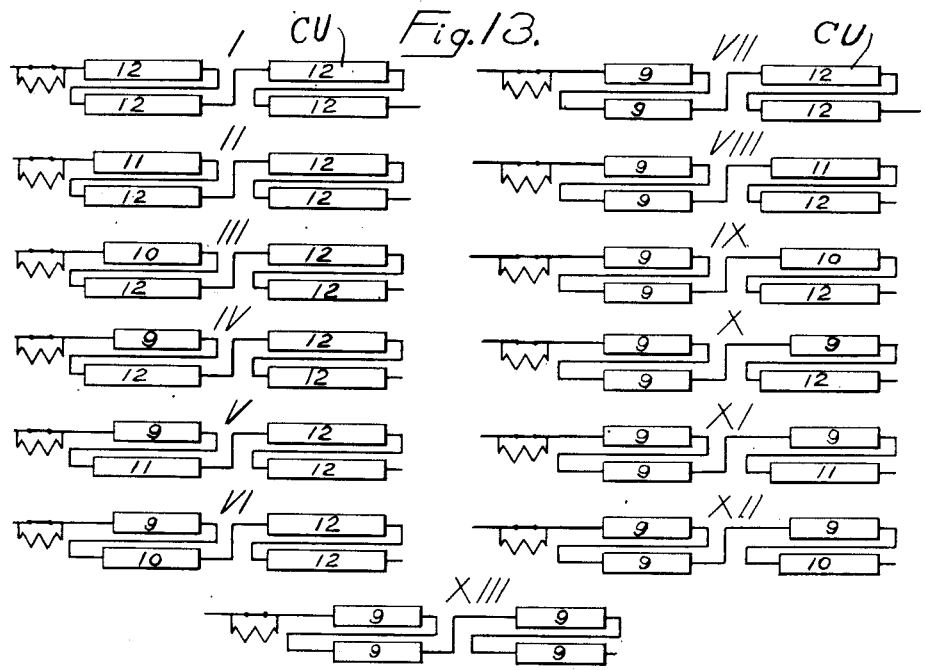
Figure 14:
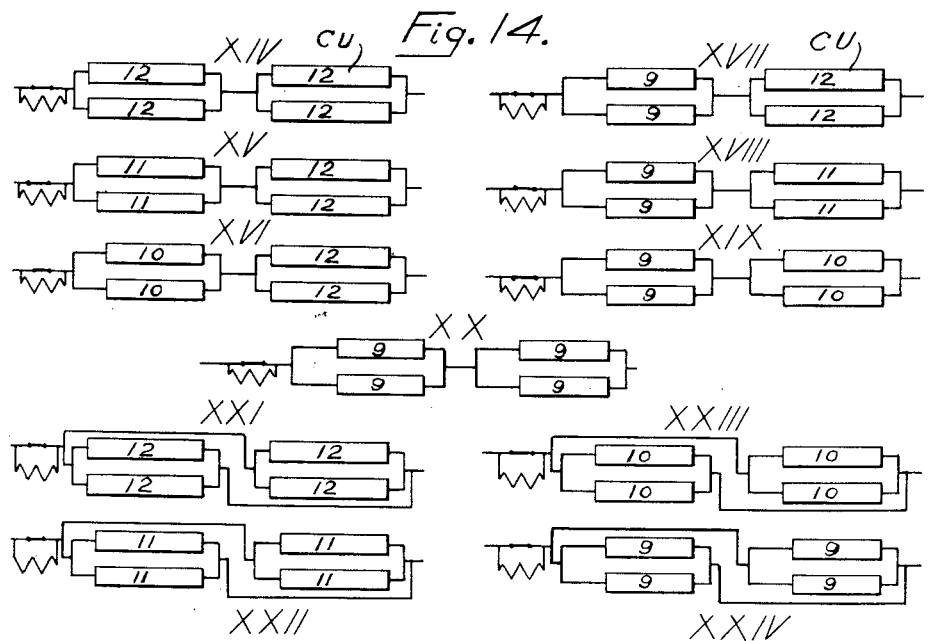

In the accompanying drawings in which similar reference characters indicate similar parts in each of the views:—Figure 1 is a diagrammatic development of a direct current machine illustrating the general principles of my invention when employed in connection with a single group. Fig. 2 is a diagrammatic development in plan view of sufficient portions of Fig. 1 to illustrate the general operation. Figs. 3 to 7 inclusive are fragmentary diagrammatic views of a commutator arrangement showing the method of commutation of coil units or windings of the armature preferably employed in a machine in which the control is of the type disclosed in the drawings. Figs. 8, 9 and 10 are detailed diagrammatic views illustrating one way in which a coil or winding may be cut out of circuit. Fig. 11 is a diagrammatic view of a different type of arrangement for performing this service. Fig. 12 is a diagrammatic representation of a machine having four groups, the view showing the general arrangement of coil units with the terminals of the groups indicated, this arrangement permitting of the change in the form of group connections, the specific changes being shown in Figs. 13 and 14. Fig. 13 is a composite view showing the four groups of Fig. 12 in series relationship, the successive views illustrating diagrammatically one order in which coil units may be cut out for the purpose of controlling the voltage or speed of the machine shown in Fig. 12. Fig. 14 is a similar view showing the sequence where the groups are changed from series to parallel relation through an intermediate parallel-series relation, the view also showing intermediate steps provided by cutting out coil units as in Fig. 13, the diagrammatic illustrations of Figs. 13 and 14 indicating what may be termed running points in the control. Fig. 15 is a similar view showing a possible intermediate sequence to provide running points between the positions of Fig. 13 and those of Fig. 14. Fig. 16 is a diagrammatic view illustrating one way in which the various circuits of a four group arrangement with a master controller may be provided to effect the various combinations shown in Figs. 13, 14 and 15. Fig. 17 is a diagrammatic view of the field and commutating pole winding employed in connection with Fig. 16. Fig. 18 is a view similar to Fig. 16, showing, however, a different field winding arrangement. Fig. 19 is a view similar to Fig. 17 with the field winding arranged as in Fig. 18. Fig. 20 is a table or diagram indicating the positions of the several switches in the different control steps or notches to produce the running points indicated in Figs. 13, 14 and 15.

Figure 3:
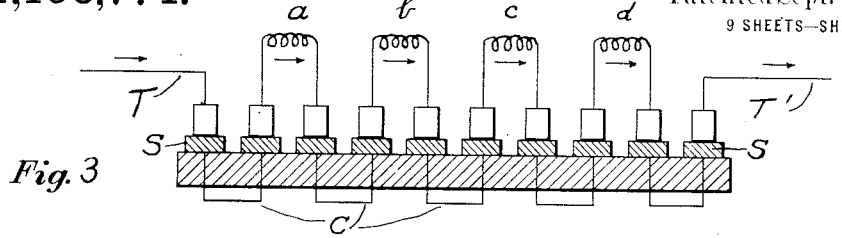
Figure 4:
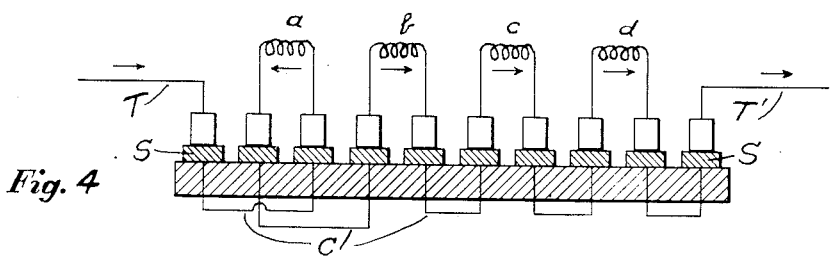
Figure 5:
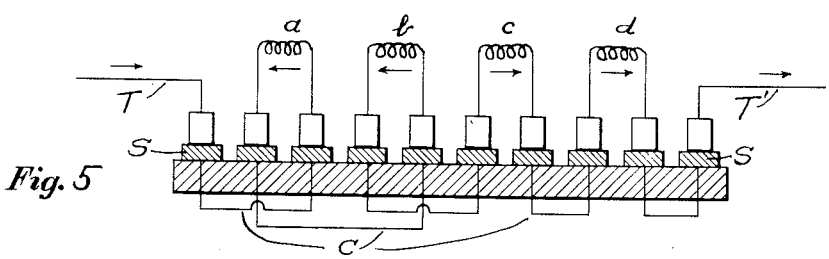
Figure 6:
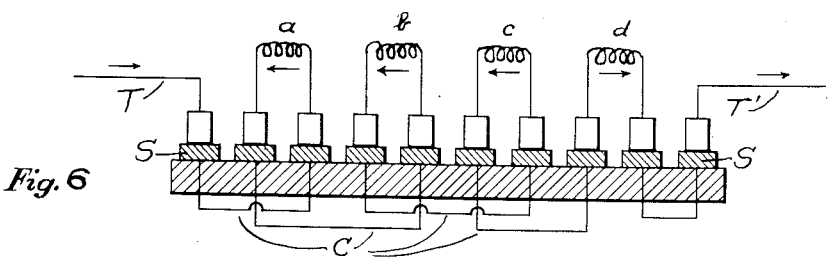
Figure 7:
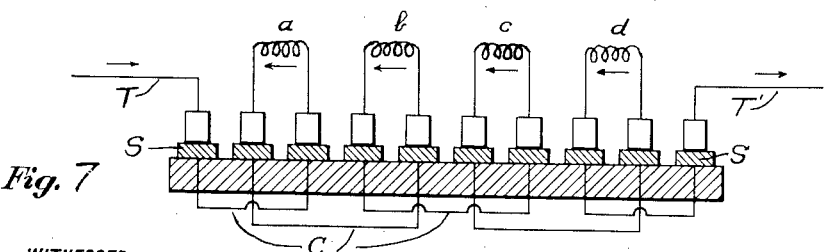

As heretofore pointed out, the present invention is more particularly adapted for use in connection with direct current machines of the type disclosed in the patent and application heretofore identified, in which a stationary armature and a rotating field are employed to provide alternating E. M. F.'s with E. M. F. time-values of definite phase relationship, the arrangement of the commutator being such that the coil units or windings of the armature are acted upon individually, a predetermined number being maintained in constant series relationship and constantly in circuit, this series relationship providing a single path from terminal to terminal of this predetermined number; this predetermined number may be termed a group, and the machine may have a single group or a plurality of groups, these groups being adapted to be placed in series or other relationships without affecting the series and circuit relationships referred to. The manner of arranging the commutator segments and connections to provide this result is illustrated diagrammatically in Figs. 3 to 7 which show diagrammatic sectional views of a commutator operating in connection with four coil units or windings as a group, the view showing the changes in the connections of the several windings when their E. M. F.'s have been successively reversed, the coil units being indicated at $a$, $b$, $c$ and $d$, the terminals at T and T', the segments at S, the connections at C, the arrows indicating the direction of current flow. As will be seen from these views, each coil unit has its terminals in the form of brushes, the latter being adapted to ride on the surfaces of the commutator segments, the connections between the several coil units being provided by the connections C of the commutator segments. As the direction of E. M. F. of a coil unit reverses in the operation of the machine, the manner in which its terminals (brushes) are connected with adjacent units also changes, as shown for instance in the change of connections of coil unit $a$ shown in Figs. 3 and 4, so that the single series path through the series of coil units is maintained throughout the various changes produced in machine operation, Figs. 3 and 7 showing reversals of the coil units shown without affecting the continuous direction of current flow.

The number of coil units which may form a group will be determined by the machine construction, dependent upon its use, as it is obvious that the entire number of coil units may form a single group by simply continuing connections in the manner shown to meet the commutating conditions, but in each instance, the coil unit is normally an open-circuit coil unit which has its terminals coacting with a commutator so as to maintain it constantly in series relation with its neighboring units and in a constantly closed circuit.

The control feature herein disclosed retains the above features and at the same time provides for cutting out coil units of a group for the purpose of varying the voltage or the speed as the case may be. This is provided for by increasing the number of coil units or windings within the group and providing means which will enable the additional units or windings to be cut out at will, without affecting the remaining windings or units of the group. For example, the preferred minimum number of windings or units which would constitute the permanent units of the group is nine, this number providing a substantially continuous E. M. F. at the terminals of the group. If it is desired to provide a control variation by cutting out three units, three additional units or windings would be added, thus increasing the number in the group to twelve units. If greater variations are desired, the number of coil units within the group may be still further increased thus increasing the number capable of being cut out without materially affecting the continuity of E. M. F. This control variation may be provided where all of the units or windings of the machine are in a single group and therefore constantly in series throughout the armature, such an arrangement being shown in Figs. 1 and 2, this particular arrangement preferably employing coil units or windings each formed of a number of conductors or coils connected in series within the armature, the terminals of the connected coils or conductors forming the terminals of the coil unit, the coil unit terminals being two in number and each coöperating with a commutator by the employment of one or more brushes. In this particular type the control is provided by cutting out any or all of the conductors or coils of one or more coil units.

Where the control operates in connection with a plurality of groups additional changes can be provided by connecting the groups in series or parallel, etc., two groups permitting the change from series to parallel, four groups permitting an intermediate parallel-series condition, etc. A diagrammatic illustration of the arrangement where four groups are employed is shown in Fig. 12, in which the two commutators shown may be commutators of a single machine or each may be of a separate machine.

Referring more particularly to Figs. 1 and 2, $a'$, $b'$, $c'$, $d'$, etc., $a^2$, $b^2$, $c^2$, $d^2$, etc., $a^3$, $b^3$, $c^3$, $d^3$, etc., and $a^4$, $b^4$, $c^4$, $d^4$, etc., indicate coils or conductors of an armature of the type of machine referred to, these coils or conductors being connected to form what may be termed coil units or windings, the terminals of each unit being in the form of brushes corresponding to the brushes shown in Figs. 3 to 7, these brushes being adapted to coöperate with the commutator 90. For instance, the conductors indicated at $a'$, $a^2$, $a^3$ and $a^4$ form one coil unit, $b'$, $b^2$, $b^3$ and $b^4$ form another coil unit; in other words, the conductors having similar reference letters may be considered as forming a coil unit. As will be seen the coil units $a$, $e$, and $i$ have their conductors provided with terminals coöperating with switches, while the remaining coil units are of the general type indicated in Fig. 3, the latter coil units forming what I have referred to as the permanent units of the group, the three units $a$, $e$ and $i$ being added for control purposes. As the arrangement shown in these figures provides for the cutting out of individual coils or conductors, the conductors are shown as being in series relationship.

In Fig. 2 the switches are indicated at 50, 51, 52, etc., to 61, and when in the position shown in full lines, the conductor controlled by the switch is in circuit, the dotted line position of the switch indicating that the conductor is cut out of circuit. For instance, assuming that all of the switches are in the full line position all of the conductors are in circuit. If switch 50 is now moved to the dotted line position, the conductor $a'$ will be cut out of circuit, leaving the circuit of coil $a$ provided by the conductors $a^2$, $a^3$ and $a^4$. If the switches 53, 56 and 59 be successively moved to the dotted line position, the conductors $a^2$, $a^3$ and $a^4$ will be successively cut out of circuit, thus cutting out coil unit $a$. Similarly the successive movement of the switches 51, 54, 57 and 60 will have the effect of cutting out coil unit $e$ through successively cutting out its conductors. Obviously a similar action may be had with respect to coil unit $i$. As will be seen, the conductors which are cut out are at different points, preferably equi-spaced, thus reducing the tendency to unbalance armature reaction.

Any suitable means may be employed for providing the cutting in and out of circuit of a coil unit or conductor, one form being shown in Figs. 8, 9 and 10, this arrangement permitting the conductor or unit to be cut out or cut in without opening the circuit. In these figures, assuming the conductor $a'$ to be that shown, 70 and 71 indicate the leads to and from the conductor, and 72 the lead from the coil unit circuit. The leads 70 and 71 are shown as connected to terminals on a fixed block 73, while the lead 72 is shown as connected to terminals carried by a movable block 74, said lead being provided with a resistance 72ª between the terminals.

In Fig. 10 the conductor $a'$ is shown as in circuit, the position of the block 74 being such as to provide this effect. Fig. 8 shows the block 74 as having been moved to a position where the conductor $a'$ is cut out of the circuit. In passing from one of these positions to the other, the block is moved through an intermediate position shown in Fig. 9, the conductor $a'$ being shunted by the resistance 72ª while in the position of Fig. 9, thus providing for the cutting in or out operation without opening the circuit, this being a well known method which may be employed for this purpose.

As will be readily understood, the cutting out of a conductor will have the effect of reducing the terminal voltage if employed in connection with a generator, or of increasing the speed where employed in connection with a motor. And since the conductors are carried by a stationary armature, it will be readily understood that this cutting in and out operation may be performed without difficulty while the machine is in operation.

While I have shown in Figs. 1 and 2 the idea as applied to the cutting out of individual conductors of a coil unit, a preferred arrangement is to cut out coil units as an entirety such an arrangement being shown in Fig. 12 in which the units are shown as forming four groups, the units of each group being connected in series through the commutator arrangement, said view illustrating a general switching operation similar to that shown in Fig. 2, excepting that each switch controls a coil unit as an entirety.

By providing for cutting out coil units as in Fig. 12, it is possible to employ any desired arrangement in the conductors forming the coil unit, enabling the conductors to be arranged in series, parallel or a combination of both as may be desired. Where the cutting out of individual conductors is employed as in Fig. 2, the arrangement practically requires that the conductors be in series.

The general idea shown in Fig. 12 enables the invention to be particularly adapted for use in controlling the speed of motors, especially where the latter are used for railway work, or other operations where wide variations in motor speed are desirable. Examples of these are shown in Figs. 13 to 20, which represent a plurality of coil units arranged in four groups; the coil units may be in one motor or in two motors as desired, the operation being substantially the same in either case, the use of two motors providing a possible advantage in enabling the changes to be made without entirely opening the circuit as presently explained.

In Fig. 13 I have shown diagrammatically a series of running positions which may be provided by the cutting out operation heretofore referred to with respect to Fig. 12, these diagrammatic views being successively arranged, with each group having twelve coil units, the arrangement providing for the cutting out of three coil units from each group. These thirteen views disclose running positions where the groups are in series. For instance, in the first position all of the twelve coil units of each group are in circuit; in the second position one coil unit of the first group is cut out of circuit; in the third position a second coil unit of that group is cut out, while in the fourth position the third unit of that group is cut out, the remaining groups having all their coil units in circuit. The next position retains the first group with nine units in circuit and cuts out one unit of the second group. As will be seen, this successive cutting out of units is continued until position XIII is reached, this position indicating that only the permanent coil units of each group remain in circuit.

Fig. 14 shows seven positions XIV to XX in which the groups are in parallel-series relation, the cutting out of coil units in sequence being indicated. In these seven positions it is seen that two coil units are cut out at each step, this being necessitated by the parallel connection of two groups. Said figure also shows, in positions XXI to XXIV, the groups arranged in parallel with coil units cut out to effect the various changes desired. In these four positions it is necessary to cut out four coil units, one in each group at each step, due to the parallel relation of groups. In these views the number of coil units in circuit is indicated by the numerals placed on the rectangles each of which is intended to represent a group. From these positional views it will be seen that the cutting out of coil units enables variations in speed to be provided whether the groups be connected in series, parallel-series or parallel, each position providing a running point and enabling the speed to be varied within comparatively wide limits.

If desired, additional running positions may be provided as indicated in Fig. 15, the positions shown therein being between positions XIII and XIV shown in Figs. 13 and 14, position XIIIª being equivalent to position XIII, since the number of coil units in series is the same in both positions, the first group, however, being entirely cut out in the positions of Fig. 15. As will be understood, the groups of Fig. 15 are in series and form, when employed, a continuation of the positions shown in Fig. 13. The positions of Fig. 15, while possible, are such as tend to provide difficulties unless the arrangement of coil units is such as to avoid unbalancing and auxiliary devices be employed for raising the brushes of the group cut out of circuit from the commutator; hence they would be employed only where necessary to give a more gradual increase in speed than provided for in changing from position XIII to XIV.

In Figs. 16 and 18 I have shown diagrammatically a switching arrangement and master controller for providing positions shown in Figs. 13, 14 and 15, it being assumed that the motor is employed in railway work, receiving current from a trolley and being connected to ground. These figures differ from each other in that Fig. 16 shows the entire field winding FW as in series with but one group, preferably the last group, thus placing it between the armature and the ground connection, which reduces insulation difficulties in the field; in Fig. 18 the field is shown as divided into as many windings, $fw^1$, $fw^2$, $fw^3$ and $fw^4$, as there are groups, each separate winding being permanently in series with a separate group.

Where but a single motor is employed, the motor having the four groups of coil units shown in Fig. 16, the field winding arrangement of that figure is preferred since it involves the use of but two slip rings, as indicated more particularly in Fig. 17. Where the four groups are arranged in two motors (for instance, the two upper groups in one motor, the two lower groups in the other motor), a field winding FW would be connected up in each motor being in series with one of the groups of that motor. For instance, if the division of groups is as indicated above, the additional winding would be connected in series with the group next to the top group.

The arrangement shown in Fig. 18 employs a distinct field winding, $fw^1$, $fw^2$, $fw^3$ and $fw^4$, for each group as indicated in Fig. 19, requiring the use of a large number of slip rings.

The object in connecting the entire field winding FW in series with but one group as in Fig. 16 is to maintain the fixed relation between the strength of commutating pole (and compensating winding when used) and the current in the armature conductors. It will be readily seen that were the field winding FW to receive all the current of four groups in parallel, as in Fig. 14, views XXI to XXIV it would be four times as strong (neglecting saturation) as it would be when the four groups were in series as in Fig. 13, yet the current to be commutated in any one conductor would be the same, hence difficulties would arise. The same object is accomplished by subdividing the field windings into as many equal portions as there are groups and placing each portion permanently in series with a separate group as shown in Figs. 18 and 19. If desired, these separate field windings $fw^1$, $fw^2$, $fw^3$, and $fw^4$ could be independent of the armature groups and placed in the various circuit relationships by a separate set of switches. It is obvious that the necessity of maintaining the fixed relationship between armature conductor current and field winding applies only to the auxiliary fields, the main field winding being shown similarly connected for convenience only.

In both Figs. 16 and 18 the general connections including switches and the master controller are similar, so that an explanation of Fig. 16 will suffice. The coil units as a group are indicated at CU, as in Figs. 13, 14 and 15, the commutator being omitted in Figs. 16 and 18, it being assumed that the terminal brushes of the coil units are connected up as shown in Figs. 3 to 7, and Fig. 12. For the purposes of illustration it is assumed that current is being supplied from the trolley line Tr, the ground connection being indicated at G. The switches are indicated at 100, 101, etc., to 124, the switch 100 being the main switch controlling the supply, switch 101 controlling the starting resistance SR, switches 102 to 112 inclusive, controlling the arrangement of groups, while switches 113 to 124 control the cutting in and out of individual coil units.

Any desirable type of switches may be employed, Fig. 11 illustrating one form of solenoid switch. Suitable methods of operating the switches may be employed, that shown in the drawings being of low voltage supplied by a battery, Bat, this being simply an example of one of different ways in which such control of switch operation can be had.

MC represents the master controller in which the contacts are arranged to provide the various positions shown in Figs. 13, 14 and 15 together with the necessary transition positions, the positions shown corresponding to those indicated on the diagram of Fig. 20, the latter indicating the positions of the several switches in the different control steps or notches.

As will be seen by referring to Fig. 20, the first position places the groups in series at the time of closing the circuit through switch 100, this position having the starting resistance SR in circuit; this is but a transition position, the first running position being with the starting resistance cut out, this being shown as the second position of the figure, the switch 101 being closed, this being the first position of Fig. 13. Positions 3 to 14 indicate the closing of the coil unit switches 113 to 124 for providing the remaining running steps shown in Fig. 13, the groups being in series.

As Figs. 16 and 20 are assumed to employ a single motor with four groups the change in relationships of groups is provided by opening the switch 100, this being indicated in position 15 of Fig. 20. Positions 16 to 27 inclusive of said Fig. 20 provide for the setting of switches to provide the running positions shown in Fig. 15, one group of coil units being cut out of circuit; as heretofore stated, this set of positions is optional. If these positions are not employed, the succession of positions in Fig. 20 would pass from 15 to 29, position 28 being that of opening the circuit when change is made from the final position of Fig. 13 to the first position of Fig. 14, said latter position being indicated at 31 in Fig. 20, positions 29 and 30 being transition positions leading to the placing of the groups in parallel-series.

Positions 31 to 37 provide the positions XIV to XX of Fig. 14, after which the circuit is opened and the switch is reset to provide the position 40 which corresponds to the position XXI of Fig. 14, the succeeding running positions being provided by the remaining positions 41 to 43 of Fig. 20.

Where more than one motor is employed to provide the groups, the necessity for opening the circuit for transition purposes is reduced or eliminated, the usual practice of short-circuiting motors being possible.

Inasmuch as switches 111 and 112 operate only in unison they are shown as controlled by a single circuit. Similarly switches 106, 107, 108, 109 and 110 are operated by a single circuit for the same reason. This reduces the number of control circuits.

From the above it will be seen that not only is it possible to secure in one machine the control heretofore provided by the use of a plurality of direct current machines, in which the circuit relationships between the machine is varied, but in addition large numbers of variations in each circuit relationship may be had. Or, as indicated above, these variations are had where the groups form parts of more than one machine. As will be understood, these variations are not simply for transition purposes but are actual running points in the control, thus providing for facile operation of the machine.

While I have herein shown and described several ways in which my invention may be carried into effect, it will be readily understood that changes and modifications therein may be required or desired to meet individual preferences or the exigencies of use, and I desire to be understood as reserving the right to make such changes or modifications in so far as the same may fall within the spirit and scope of the invention as expressed in the accompanying claims.

Having thus described my invention, what I claim as new is:—

1. In direct current machines, a predetermined number of sources of alternating E. M. F.'s forming a polyphase group cooperating with a commutator to provide a series circuit through the group, and means for varying the number of sources active in the group at will.

2. In direct current machines, a predetermined number of sources of alternating E. M. F.'s forming a polyphase group cooperating with a commutator to provide a series circuit through the group, and means for varying the number of sources active in the group at will by cutting out of circuit one or more of the sources without opening the circuit.

3. In direct current machines, a predetermined number of sources of alternating E. M. F.'s forming a group with each source permanently and individually maintained in series and in circuit through a commutator, and one or more additional sources included within the group and adapted to be active therein at will.

4. In direct current machines, a predetermined number of sources of alternating E. M. F.'s forming a group with each source permanently and individually maintained in series and in circuit through a commutator, and a plurality of additional sources included within the group and adapted to be active therein at will, said additional sources being interspaced with respect to the permanent sources.

5. In direct current machines, a predetermined number of sources of alternating E. M. F.'s, forming a plurality of groups, each group having its sources individually cooperating with a commutator to provide a series circuit within and through the group, and means for varying the number of sources active in a group at will.

6. In direct current machines, a predetermined number of sources of alternating E. M. F.'s, forming a plurality of groups, each group having its sources individually cooperating with a commutator to provide a series circuit within and through the group, and means for varying the number of sources active in each group at will.

7. In direct current machines, a predetermined number of sources of alternating E. M. F.'s, forming a plurality of groups, each group cooperating with a commutator to provide a single circuit within and through the group, means for varying the number of sources active in each group at will, and means for connecting the groups in series, parallel or a combination of both.

8. In direct current machines, a predetermined number of sources of alternating E. M. F.'s. forming a plurality of groups, each group coöperating with a commutator to provide a single circuit within and through
5 the group, and means for connecting the groups in series, parallel or a combination of both.

In testimony whereof I affix my signature in presence of two witnesses.

CHARLES W. GIRVIN.

Witnesses:
  HORACE G. SEITZ,
  EDWIN S. CLARKSON.